July 13, 1926.
R. F. ANDERSON
FOLDING AUTOMOBILE SEAT
Filed Jan. 6, 1925 2 Sheets-Sheet 1
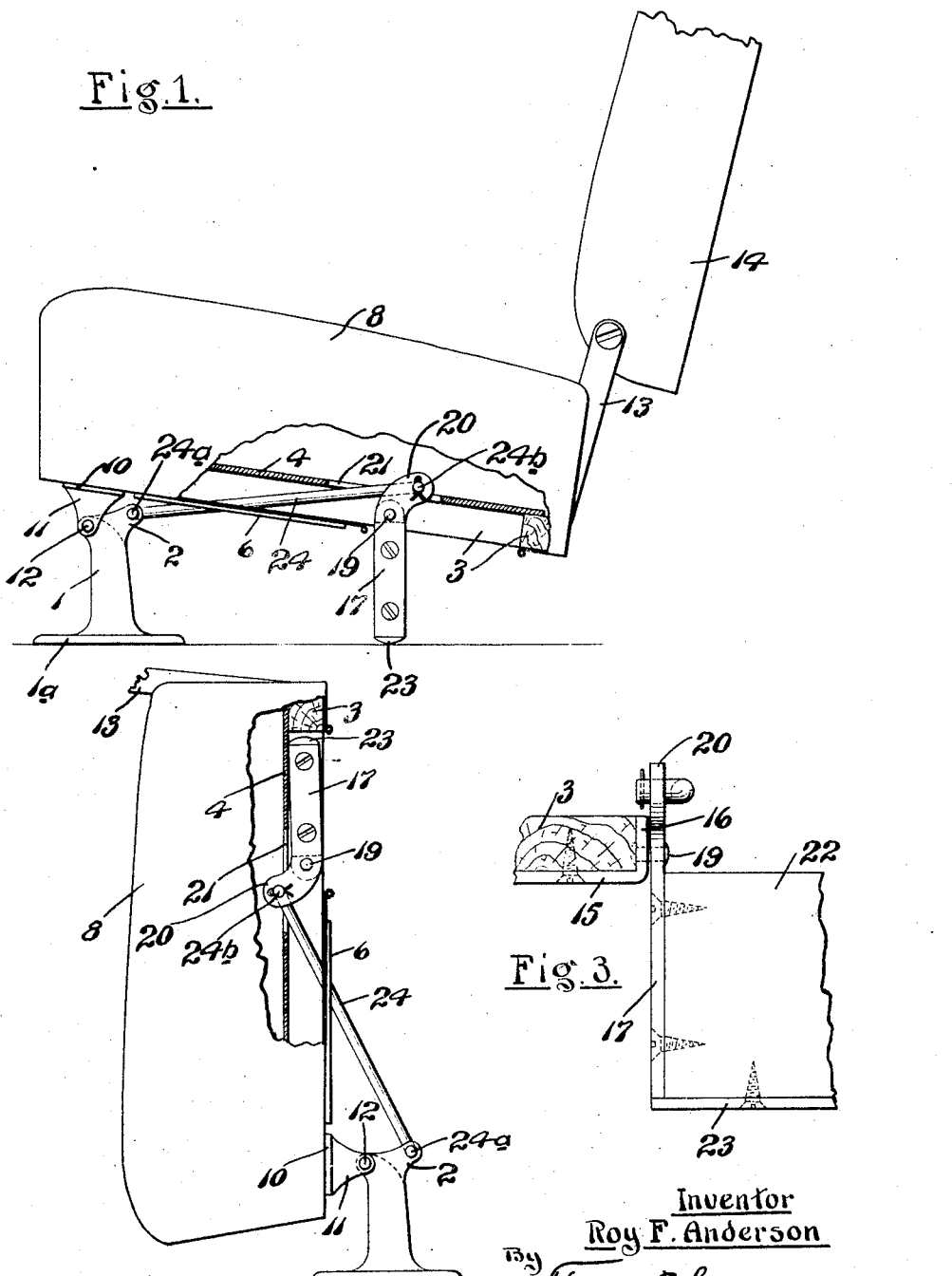

July 13, 1926.  1,592,593

R. F. ANDERSON

FOLDING AUTOMOBILE SEAT

Filed Jan. 6, 1925  2 Sheets-Sheet 2

Inventor
Roy F. Anderson
By Frank E. Liverance, Jr.
Attorney.

Patented July 13, 1926.

1,592,593

UNITED STATES PATENT OFFICE.

ROY F. ANDERSON, OF GRAND RAPIDS, MICHIGAN, ASSIGNOR TO THE HAYES-IONIA COMPANY, OF GRAND RAPIDS, MICHIGAN, A CORPORATION OF MICHIGAN.

FOLDING AUTOMOBILE SEAT.

Application filed January 6, 1925. Serial No. 761.

This invention relates to a folding automobile seat and one primarily designed to be used as a front seat in automobiles having enclosed bodies though not in any sense limited in use to this one place. It is an object and purpose of the present invention to construct a seat which may be made to occupy a substantially horizontal position when in service, being supported at its rear portion by a suitable leg support, and which can be turned to a vertical position when desired, means being provided in connection with the leg support acting to automatically fold said support within the body of the seat so that it will be entirely out of the way and not project so as to interfere with persons moving adjacent the seat. This is particularly desirable in the smaller closed body automobiles where the folding seat is located alongside the seat occupied by the driver. The invention comprises many novel constructions, combinations and arrangements of parts for effectively and practically producing a folding seat having the advantages and properties above stated, as well as many others not specifically enumerated at this time, but which will appear as an understanding of the invention is had from the following description, taken in connection with the accompanying drawings, in which, Fig. 1 is a side elevation of the seat made in accordance with my invention, parts being broken away and shown in section for a better disclosure of the construction thereof.

Fig. 2 is an elevation similar to that shown in Fig. 1, but with the seat in folded position.

Fig. 3 is a fragmentary enlarged detail illustrating the manner of pivotally mounting the folding leg support for the seat to said seat.

Like reference characters refer to like parts in the different figures of the drawings.

The seat is designed to be supported at its front portion by two spaced apart vertical posts 1, having enlarged bases 1ª at their lower ends for securely connecting the same to the floor of an automobile body. One of the posts 1, at its upper end is formed with an integral rearwardly and upwardly extending lug or ear 2 for a purpose later appearing.

Figure 4:
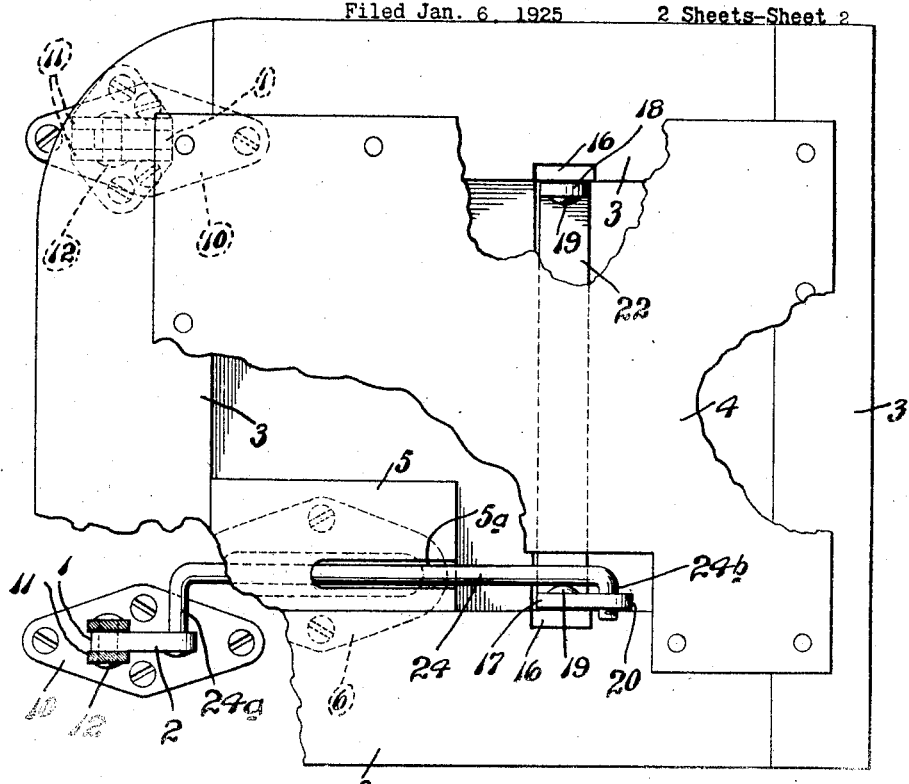
Fig. 4 is a plan, with parts broken away, of the seat with the cushion springs and upholstering covering the same removed.

In the construction of the seat, a rigid frame is provided having spaced apart sides and spaced apart front and back, all indicated at 3, the frame being open at its inner portion. A plate 4 of metal is laid above and securely attached to said frame covering the central opening of the frame and serving as a support for the seat cushion springs located above it. At one front corner of the opening in the frame, a block 5 of wood is located and secured in place, having the same thickness as the frame members and lying under the plate 4, serving as a support for a metal plate 6 through which an elongated slot 7 is cut, the block 5 being slotted and grooved as indicated at 5ª in alinement with the slot 7, as shown in Fig. 4. The seat is completed by addition of the usual cushion springs above the plate 4, covered with the usual upholstery covering indicated at 8, the frame and springs being completely covered at all sides except for a rectangular opening 9 left in the bottom of the seat, and best shown in Fig. 5.

The seat is pivotally connected at the upper ends of the posts 1 by means of suitable brackets 10 fixed to the lower front end portion of the seat and each having two spaced apart depending ears 11 between which the upper ends of the posts 1 may pass, a pivot pin 12 passing through the ears and upper ends of the posts, as shown. The seat may be equipped with a back 14 foldably connected at its lower end to the upper ends of bars 13 connected to the rear end of the seat. The back may be turned down over the seat in accordance with well known construction.

A bar 15 of metal is attached to the under side of each side member 3 of the seat frame and is formed with an inner end turned upwardly at right angles as indicated at 16. These bars are located directly opposite each other and at each side of the opening or recess 9 left in the under side of the seat. Two bars 17 and 18 are pivotally connected at 19 to the parts 16, the bar 17 being continued upwardly in a curved extension 20. The plate 4 above said bar 17 is slotted as shown at 21 so as not to interfere with the movement thereof. A cross member 20 of wood, preferably, is located between the bars 17 and 18 and permanently secured thereto and in practice, a bottom strip 23 of metal is attached at the under edge of the member 20. The structure made up of bars 17 and 18, the cross member 22 and the bottom strip 23 is designed to serve as a supporting leg structure for the rear portion of the seat and the same may be placed in vertical position when the seat is substantially horizontal to act as a support, and may be folded to be entirely received within the opening or recess 9 when the seat is turned to vertical position.

Figure 5:
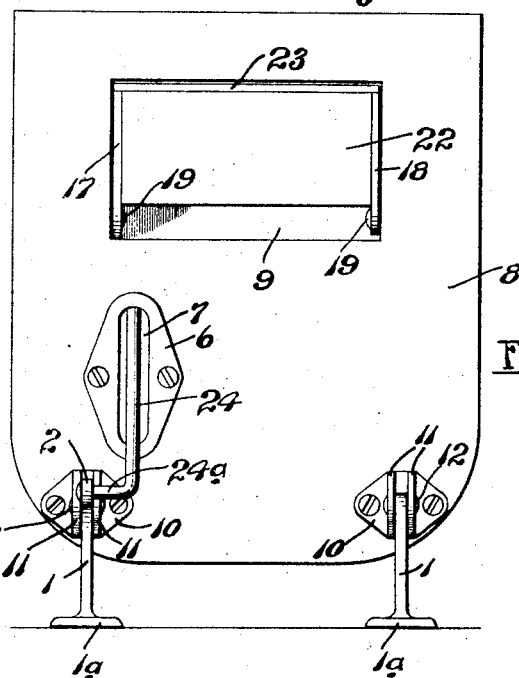
Fig. 5 is a rear elevation of the seat when the same has been moved to folded position.

It is desirable that the said supporting leg shall be automatically turned to folded position when the seat is moved from its normal horizontal position to vertical position. To accomplish this, a rod 24 is passed through the slot 7 in plate 6 and through the slot 5$^a$ in block 5, at its front end being turned at right angles to make a section 24$^a$ which is connected to the ear 2 on one of the posts 1, and at its rear end turned at right angles in the same direction to make a short section 24$^b$ which is connected with the extension 20 at the upper inner end of the bar 17. As, in the movement of the seat from horizontal to vertical position, the post 1 and part 2 thereon remain fixed, the effect of such movement is to automatically turn the leg support about the axis of pivots 19 and move the said leg support into the opening or recess 9 in the bottom of the seat, as shown in Figs. 2 and 5.

With the construction of seat as described, the rear leg support therefor automatically moves to proper supporting position when the seat is put in horizontal operative position, and automatically moves to folded position within the recess 9 in the seat when said seat is turned to vertical position. The construction is simple but very practical in all respects, and it has proved its merit in actual practice. The invention is defined in the appended claims and is to be considered comprehensive of all forms of construction coming within the scope of said claims.

I claim:

1. In combination, a seat having a recess in the under side thereof, supporting means for the seat at the front portion to which the seat is pivotally connected, a support for the rear portion of the seat pivotally connected thereto at a point within said recess, and means connecting the said front supporting means and the rear support whereby said rear support is folded into the recess on turning the seat upwardly and unfolded to project substantially from the seat at right angles thereto when the seat is moved to substantially horizontal position.

2. In combination, spaced apart vertical supports, a seat pivotally connected at its front end to said supports, said seat having a recess in its under side at its rear portion, a supporting leg pivotally connected at one end to said seat within said recess, and a rod connecting the supporting leg with one of said vertical supports acting to fold the supporting leg wholly within the recess when the seat is turned to vertical position, and turn the same outwardly when the seat is turned to substantially horizontal position.

3. In combination, two spaced apart vertical posts, one of the posts being formed with an upwardly and rearwardly extending ear, a seat located over the posts and pivotally connected thereto at the front portion of said seat, said seat having a recess in its under side at the rear portion thereof, bars pivotally connected to the seat within said recess, one of said bars having an extension beyond the pivot thereof, a member disposed between and connected to said bars, and a rod connected at its front end to said ear and at its rear end to said extension of said bar, substantially as and for the purposes described.

4. In combination, two spaced apart vertical posts, one of the posts being formed with an upwardly and rearwardly extending ear, a seat including a seat frame of substantially rectangular shape located over the posts, said seat frame having its middle portion open, brackets attached to and extending downwardly from the front portion of the seat frame, pivotal connections between said brackets and the upper ends of the posts, a covering for the seat frame covering all thereof except a rectangular recess adjacent the rear portion thereof, a supporting leg structure pivotally mounted on and between opposite sides of the frame adapted to enter said recess, there being an extension to the supporting leg structure at one side upwardly and to the rear, and a rod connecting the said extension and said ear on said post, substantially as and for the purposes described.

In testimony whereof I affix my signature.

ROY F. ANDERSON.